(12) United States Patent
Visco et al.

(10) Patent No.: US 6,991,662 B2
(45) Date of Patent: Jan. 31, 2006

(54) ENCAPSULATED ALLOY ELECTRODES

(75) Inventors: Steven J. Visco, Berkeley, CA (US); Yevgeniy S. Nimon, Danville, CA (US); Bruce D. Katz, Berkeley, CA (US)

(73) Assignee: PolyPlus Battery Company, Berkeley, CA (US)

( * ) Notice: Subject to any disclaimer, the term of this patent is extended or adjusted under 35 U.S.C. 154(b) by 348 days.

(21) Appl. No.: 10/189,908

(22) Filed: Jul. 3, 2002

(65) Prior Publication Data

US 2003/0088971 A1 May 15, 2003

Related U.S. Application Data

(60) Provisional application No. 60/318,552, filed on Sep. 10, 2001.

(51) Int. Cl.
H01M 4/58 (2006.01)
H01M 6/00 (2006.01)

(52) U.S. Cl. ............... 29/623.4; 29/623.5; 429/231.95

(58) Field of Classification Search ............... 29/623.1, 29/623.4, 623.5; 429/231.95
See application file for complete search history.

(56) References Cited

U.S. PATENT DOCUMENTS

| | | | |
|---|---|---|---|
| 6,025,094 A | 2/2000 | Visco et al. | |
| 6,228,534 B1 * | 5/2001 | Takeuchi et al. | ............ 429/219 |
| 6,402,795 B1 * | 6/2002 | Chu et al. | .................. 29/623.5 |

FOREIGN PATENT DOCUMENTS

| | | |
|---|---|---|
| WO | WO 99/43034 | 8/1999 |
| WO | WO 01/33651 A1 | 10/2001 |

OTHER PUBLICATIONS

Takada et al., "Research on highly reliable solid-state lithium batteries in NIRIM", Journal of Power Sources 97-98, Received Jun. 16, 2000; accepted Dec. 31, 2000, pp. 762-764.

Takada et al., "Lithium iron sulfide as an electrode material in a solid state lithium battery", Solid State Ionics 117, received Apr. 10, 1998; accepted Aug. 30, 1998; pp. 273-276.

Kanno et al., "Synthesis of a new lithium ionic conductor, thio-LISICON-lithium germanium sulfide system", Solid State Ionics 130, received Aug. 27, 1999; received in revised form Nov. 10, 1999; accepted Nov. 25, 1999, pp. 97-104.

Drusedau et al., "Plasma deposited non-stoichiometric hydrogenated germanium sulfide a-$Ge_{1-x}S_x$:H ($x$-0.3)", Journal of Non-Crystalline Solids, 198-200 (1996) pp. 111-114.

"Lithium ION Conductive Solid Electrolyte and Process for Synthesizng the Same", 5500291, Abstract, Patents Alert / Journal of Power Sources 66 (1997) 175-195, p. 183.

Takada et al, "Electrochemical behaviors of $Li^+$ ion conductor, $Li_3PO_4$-$Li_2S$-$SiS_2$", Journal of Power Sources, 43-44 (1995) pp. 135-141.

Bychkov et al., "Percolation transition in Ag-doped chalcogenide glasses: comparison of classical percolation and dynamic structure models", Solid State Ionics 113-115, received Sep. 4, 1998; accepted Sep. 12, 1998, pp. 691-695.

Takada et al., "Electrochemical behavior of $Li_xMO_2$ (M=Co, Ni) in all solid state cells using a glass electrolyte", Solid State Ionics 79 (1995) 284-287.

* cited by examiner

*Primary Examiner*—Patrick Joseph Ryan
*Assistant Examiner*—Julian Mercado
(74) *Attorney, Agent, or Firm*—Beyer Weaver & Thomas LLP

(57) ABSTRACT

Disclosed are methods for forming active metal battery alloy electrodes having protective layers ("encapsulated electrodes"). Charged and uncharged encapsulated alloy electrodes and methods for their fabrication are provided.

10 Claims, 6 Drawing Sheets

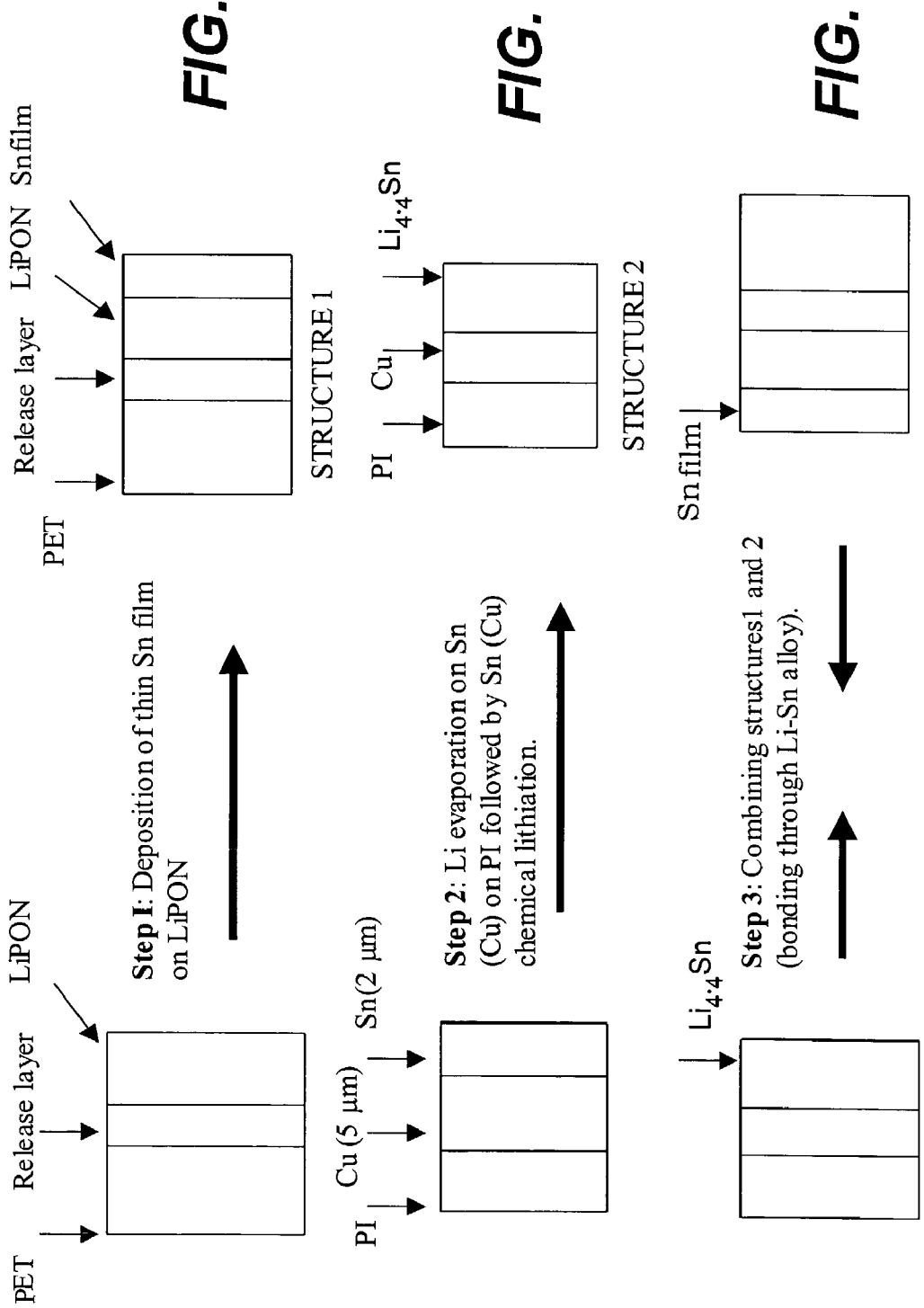

ENCAPSULATED ALLOY ELECTRODES

CROSS-REFERENCE TO RELATED APPLICATIONS

This application claims priority to U.S. Provisional Patent Application No. 60/318,552 filed Sep. 10, 2001, titled ENCAPSULATED ALLOY ELECTRODES, and naming Steven J. Visco, Yevgeniy S. Nimon and Bruce D. Katz as inventors. This provisional patent application is incorporated herein by reference for all purposes.

In addition, this application is related to U.S. patent application Ser. No. 09/431,190, filed Aug. 25, 1998 (now U.S. Pat. No. 6,413,284 issued: Jul. 2, 2002 titled ENCAPSULATED LITHIUM ALLOY ELECTRODES HAVING BARRIER LAYERS, and naming May-Ying Chu, Steven J. Visco and Lutgard C. DeJonge as inventors. This application is also related to U.S. patent application Ser. No. 09/086,665 filed May 29, 1998 (now U.S. Pat. No. 6,025,094 issued; Feb. 15, 2000), titled PROTECTIVE COATINGS FOR NEGATIVE ELECTRODES, and naming Steven J. Visco and May-Ying Chu as inventors. This application is also related to U.S. patent application Ser. No. 09/139,603 filed Aug. 25, 1998 (now U.S. Pat. No. 6,402,795 issued; Jun. 11, 2002), titled "PLATING METAL NEGATIVE ELECTRODES UNDER PROTECTIVE COATINGS," and naming May-Ying Chu, Steven J. Visco and Lutgard C. DeJoughe as inventors. This application is also related to U.S. patent application Ser. No. 09/139,601 filed Aug. 25, 1998 (now U.S. Pat. No. 6,214,061 issued; Apr. 10, 2001), titled "METHOD FOR FORMING ENCAPSULATED LITHIUM ELECTRODES HAVING GLASS PROTECTIVE LAYERS," and naming Steven J. Visco and Floris Y. Tsang as inventors. Each of these patent applications is incorporated herein by reference for all purposes.

BACKGROUND OF THE INVENTION

1. Field of the Invention

The present invention relates generally to electrodes for use in batteries. More particularly, this invention relates to methods of forming charged and uncharged alloy electrodes for use in lithium (or other alkali metal) batteries.

2. Description of Related Art

In theory, some alkali metal electrodes could provide very high energy density batteries. The low equivalent weight of lithium renders it particularly attractive as a battery electrode component. Lithium provides greater energy per volume than the traditional battery standards, nickel and cadmium. Unfortunately, no rechargeable lithium metal batteries have yet succeeded in the market place.

The failure of rechargeable lithium metal batteries is largely due to cell cycling problems. On repeated charge and discharge cycles, lithium "dendrites" gradually grow out from the lithium metal electrode, through the electrolyte, and ultimately contact the positive electrode. This causes an internal short circuit in the battery, rendering the battery unusable after a relatively few cycles. While cycling, lithium electrodes may also grow "mossy" deposits which can dislodge from the negative electrode and thereby reduce the battery's capacity.

To address lithium's poor cycling behavior in liquid electrolyte systems, some researchers have proposed coating the electrolyte facing side of the lithium negative electrode with a "protective layer." Such protective layer must conduct lithium ions, but at the same time prevent contact between the lithium electrode surface and the bulk electrolyte. Many techniques for applying protective layers have not succeeded.

Some contemplated lithium metal protective layers are formed in situ by reaction between lithium metal and compounds in the cell's electrolyte which contact the lithium. Most of these in situ films are grown by a controlled chemical reaction after the battery is assembled. Generally, such films have a porous morphology allowing some electrolyte to penetrate to the bare lithium metal surface. Thus, they fail to adequately protect the lithium electrode.

Various pre-formed lithium protective layers have been contemplated. For example, U.S. Pat. No. 5,314,765 (issued to Bates on May 24, 1994) describes an ex situ technique for fabricating a lithium electrode containing a thin layer of sputtered lithium phosphorus oxynitride ("LiPON") or related material. LiPON is a glassy single ion conductor (conducts lithium ion) which has been studied as a potential electrolyte for solid state lithium microbatteries that are fabricated on silicon and used to power integrated circuits (See U.S. Pat. Nos. 5,597,660, 5,567,210, 5,338,625, and 5,512,147, all issued to Bates et al.).

In both the in situ and ex situ techniques for fabricating a protected lithium electrode, one must start with a smooth clean source of lithium on which to deposit the protective layer. Unfortunately, most commercially available lithium has a surface roughness that is on the same order as the thickness of the desired protective layer. In other words, the lithium surface has bumps and crevices as large as or nearly as large as the thickness of the protective layer. As a result, most contemplated deposition processes cannot form an adherent gap-free protective layer on the lithium surface.

Thus, lithium battery technology still lacks an effective mechanism for protecting lithium negative electrodes.

Additionally, one of the difficulties in using lithium as a battery electrode material is its extreme reactivity which, if not controlled, can pose a safety concern. One approach to incorporating lithium in battery cells while tempering its reactivity is lithium-ion battery technology. Lithium-ion batteries have been achieved considerable commercial success, however, these batteries have substantially less energy density than lithium metal batteries (e.g., about 2050 mAh/cc for lithium metal vs. about 570 mAh/cc for $LiC_6$, a lithium ion electrode material).

Attempts have been made to use lithium alloy forming metals such as tin, aluminum, and antimony as negative electrodes in lithium batteries. Lithium alloys have the advantage of a volumetric energy density comparable to that of lithium metal (e.g., about 2045 mAh/cc for $Li_{4.4}Sn$). However, the large volume change (e.g., expansion on the order of 200 to 300 volume %) that occurs as lithium reacts with such metals leads to crumbling of such electrodes. Consequently lithium-aluminum, lithium-tin, and related alloys have been found to not cycle reversibly in lithium batteries.

Recently, battery research groups have described the use of nanoparticles of the alloying materials in a matrix of spectator materials to avoid electrode deterioration with cycling. However, the use of passive spectator materials reduces the capacity density of the electrode materials.

The use of dense tin films on copper current collectors that do not deteriorate with cycling has also been described. Improved cyclability has been reported when tin is deposited on a copper current collector and annealed at a temperature of about 200° C. This finding provides potential battery electrode materials with increased physical integrity, however, these materials remain susceptible to deleterious interactions with battery solvent systems.

Accordingly, improved methods and structures providing battery electrode materials suitable for use in lithium (and other such reactive metal) batteries would be desirable.

SUMMARY OF THE INVENTION

The present invention provides improved methods for forming active metal battery alloy electrodes having protective layers (also referred to herein as encapsulated electrodes). Active metals are those metals that can benefit from a protective layer when used as electrodes. The invention provides charged and uncharged encapsulated alloy electrodes and methods for their fabrication.

Electrodes in accordance with the present invention are particularly suitable for application in alkali metal batteries (e.g., lithium (Li-metal or Li-ion) batteries). Methods in accordance with the present invention involve providing a substantially impervious ion-conducting barrier layer on a dimensionally stable alloy. In this way, the barrier layer is not stressed and fractured by expansion of the underlying alloy during subsequent alloying with or incorporation of other metals/ions (such as alloying with lithium to create a charged cathode for a lithium metal battery; or by intercalation of lithium when the electrode is used as an anode in a lithium-ion battery). The barrier layer guards against any deleterious reaction with electrolyte components while allowing active material ions to pass through. The resulting electrodes are said to be encapsulated.

In one aspect, the invention pertains to an electrode composed of active metal (e.g., lithium) alloying metals (e.g., Sn, Al, etc.) formed on a suitable current collector (e.g., Cu) which also alloys with the active metal alloying metal to form a strong bond at the current collector-electrode interface to prevent delamination and crumbling of the electrode during cycling. The metal electrode materials may be deposited by a suitable method such as evaporation onto the current collector to form a laminate. Heating of the laminate is then conducted during or after deposition of the electrode material at a suitable annealing temperature (for example, about 200° C. to anneal Sn deposited on a copper current collector). Finally a protective glass (e.g., LiPON) electrolyte/barrier layer is deposited onto the electrode, for example using a high speed deposition process such as PE-CVD or e-beam deposition. The result is an encapsulated, uncharged alloy electrode.

In another aspect, the invention pertains to an encapsulated, uncharged alloy electrode in which the active metal alloying metal electrode material is deposited on an electrolyte barrier layer prior to contacting the metal electrode with the current collector. Once the electrode metal and current collector are contacted, annealing is performed as described above to produce the encapsulated, uncharged alloy electrode.

In yet another aspect, the invention pertains to an encapsulated, charged alloy electrode in which an active metal alloying electrode metal is applied to an electrolyte/barrier layer to form a first structure. In a second structure, the electrode metal is also applied to a current collector. The electrode metal material and current collector (e.g., Sn and Cu) are then annealed as described above. The alloy is then further alloyed with an active metal, for instance the alloy may be lithiated, for example, by evaporation of lithium onto the alloy surface. The deposited active metal preferentially alloys with the electrode metal to form an active metal alloy (e.g., $Li_{4.4}Sn$). The stoichiometry may be varied to achieve a number of final compositions. In one embodiment, the final electrode will have a pure copper current collector bound by alloying to a Cu—Sn alloy electrode layer, which in turn is bound by alloying to a Li—Sn alloy. The first and second structures are then combined and the active metal alloying metal in the first structure binds by alloying to excess active metal provided in the second structure. The resulting electrode is an encapsulated, fully charged cathode suitable for use in a lithium metal battery.

These and other features of the invention will be further described and exemplified in the drawings and detailed description below.

BRIEF DESCRIPTION OF THE DRAWINGS

FIGS. 3A–D are schematic illustrations a charged, encapsulated alloy electrode being prepared according to a third specific embodiment of the present invention.

DETAILED DESCRIPTION OF SPECIFIC EMBODIMENTS

Figure 1B:
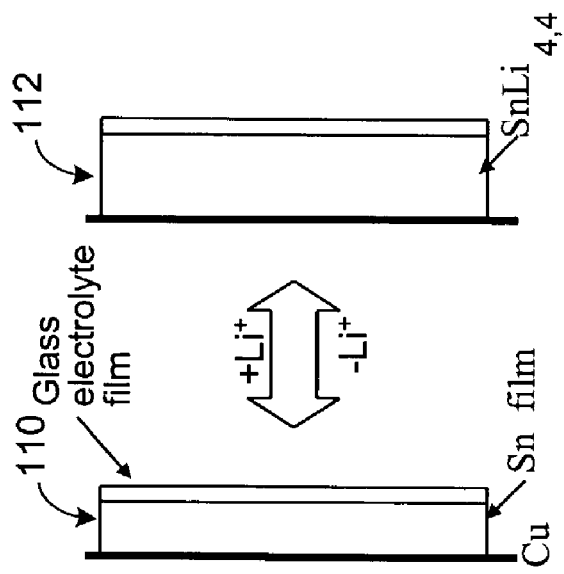
FIG. 1B is a schematic illustration of an the encapsulated alloy electrode of FIG. 1B being charged in accordance with one embodiment of the invention.

Reference will now be made in detail to specific embodiments of the invention. Examples of the specific embodiments are illustrated in the accompanying drawings. While the invention will be described in conjunction with these specific embodiments, it will be understood that it is not intended to limit the invention to such specific embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

When used in combination with "comprising," "a method comprising," "a device comprising" or similar language in this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this invention belongs.

Introduction

The present invention provides improved methods for forming electrodes which are particularly suitable for application in alkali metal batteries (e.g., lithium (Li-metal or Li-ion) batteries). In each case, methods in accordance with the present invention involve providing a substantially impervious (i.e., a sufficient barrier to battery solvents and other materials that would be damaging to the electrode material to prevent any such damage that would degrade electrode performance from occurring) ion-conducting barrier layer (e.g., a glass, such as lithium phosphorus oxynitride (LiPON)) on an alloy electrode material (e.g., Cu—Sn) that can further alloy with an active metal.

Alloying of metals generally results in an initial volumetric expansion. In accordance with the present invention, an electrode material (e.g., Sn) is contacted and alloyed with a current collector material (e.g., Cu) to a degree that volumetric expansion of the alloyed materials is substantially complete and the previously separate metals are bound by alloying at the interface. As a result, there little or no further expansion of the alloy beyond the interface (i.e., in the lateral dimensions) if it is further alloyed with an active metal material (e.g., lithium). Such an electrode alloy material is referred to herein as "two-dimensionally stable." While not wishing to be bound by theory, it is believed that any substantial further expansion of such a material upon further alloying with an active metal material occurs in a third (i.e., vertical) dimension. In this way, a barrier layer formed on the alloy electrode is not stressed and fractured by lateral expansion of the underlying alloy during subsequent alloying with or incorporation of other metals/ions (such as alloying with lithium to create a charged negative electrode (cathode) for a lithium metal battery, or when the electrode is used as an negative electrode (anode) in a lithium-ion battery. Thus, by no "substantial further expansion" it is meant that there is so lateral expansion sufficient to damage the integrity of (e.g., crack or delaminate) a barrier layer formed on the electrode. Other work indicates that volumetric expansion as a result of alloying of metals when a metal electrode material is charged with active metal (e.g., lithium) ions mostly occurs upon the initial charge (See, J. Wang et al., *Small particle size multiphase Li-alloy anodes for lithium-ion batteries* Solid State Ionics 90 (1996) 281–287, incorporated herein by reference for all purposes). Therefore, in accordance with one embodiment of the present invention in which charged electrodes are produced, further dimensional stability (e.g., in all three volumetric dimensions) may be conferred on the electrode material by charging before contacting the electrode with a barrier layer material. The barrier layer guards against any deleterious reaction with electrolyte components (e.g., solvents) while allowing active material (e.g., Li) ions to pass through. The resulting electrodes are said to be encapsulated. Electrodes in accordance with the present invention are particularly suitable for application in alkali metal batteries (e.g., lithium (Li-metal or Li-ion) batteries).

Fabrication Methods

In the following description, the invention is presented in terms of certain specific compositions, configurations, and processes to help explain how it may be practiced. The invention is not limited to these specific embodiments. For example, while much of the following discussion focuses on lithium systems, the invention pertains more broadly to other active metal battery systems as well (e.g., batteries having negative electrodes of alkali metals, alkaline earth metals, and certain transition metals).

Figure 1A:
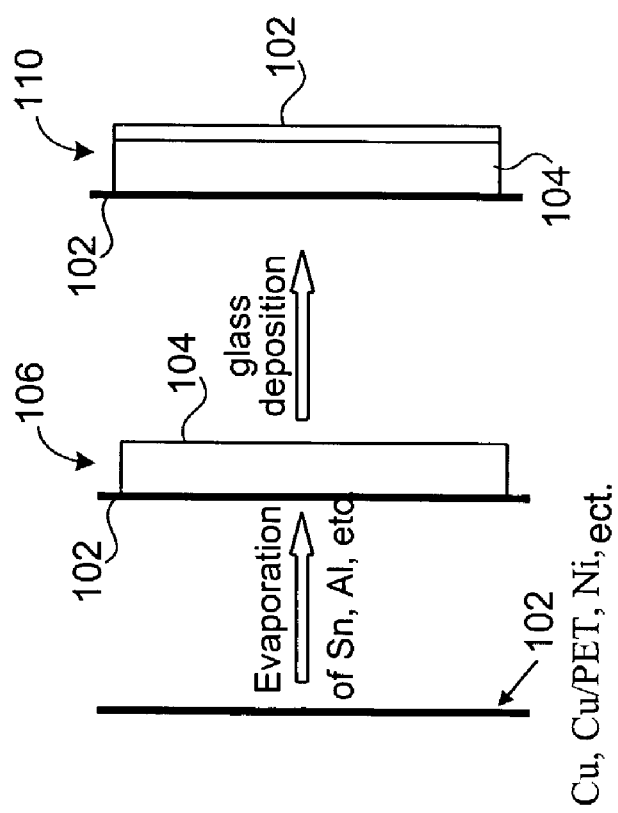
FIG. 1A is a schematic illustration of an uncharged, encapsulated alloy electrode being prepared according to a first specific embodiment of the present invention.

FIGS. 1A–B, 2, and 3A–D illustrate three specific fabrication processes in accordance with the present invention. Considering FIGS. 1A–B first, FIG. 1A illustrates steps in a process according to a specific embodiment of the present invention in which an electrode composed of one or more active metal, such as lithium (Li), alloying metals, such as, tin (Sn), aluminum (Al), etc., is formed on a suitable current collector, such one composed of Cu or Ni. The current collector may be on a releasable carrier layer (e.g., one composed of PET, as described further below with reference to FIG. 2). The active metal alloying metal electrode material may include one or more metals that moderate expansion upon alloying with further metals, for example, magnesium (Mg). The metal electrode material 104 may be deposited by a suitable method such as evaporation onto the current collector 102 to form a laminate 106. Heating of the laminate 106 is then conducted during or after deposition of the electrode material 104 at a suitable annealing temperature to form and expand the alloy until it is dimensionally stable. For example, a temperature of about 200° C. has been found to be suitable to anneal Sn deposited on a copper current collector so that any substantial further expansion during subsequent lithiation is constrained to the z (vertical rather than lateral) dimension. The current collector also alloys with the active metal alloying metal to form a strong bond at the current collector-electrode interface to prevent delamination and crumbling of the electrode during cycling. A protective glass (e.g., LiPON) electrolyte/barrier layer 108 is then deposited onto the electrode 104, for example using a high speed deposition process such as PE-CVD or e-beam deposition. The result is an encapsulated, uncharged alloy electrode 110.

As illustrated in FIG. 1B, an electrode 110 formed according to the process described with reference to FIG. 1A may be subsequently charged through the protective layer with an active metal ion. For example, in the specific embodiment shown, a Cu—Sn alloy electrode may be lithiated by using a lithium counter electrode. Other alkali metals may also be used in place of lithium. Lithium ions from the counter electrode pass through the protective barrier to intercalate with the Cu—Sn alloy electrode material and preferentially alloy with the electrode metal (in this case Sn) to form a Li—Sn alloy (e.g., $Li_{4.4}Sn$). The stoichiometry may be varied to achieve a number of final compositions.

Because the lithium is encapsulated within the protective layer and the current collector, it may be transported, stored, and otherwise handled without the precautions normally required for a lithium metal electrode. This charged electrode 112 may then be used as a cathode in a lithium metal battery, for example, paired with a sulfur electrode such as described in U.S. Pat. No. 5,686,201 titled RECHARGEABLE POSITIVE ELECTRODES, issued Nov. 11, 1997, the disclosure of which is incorporated by reference herein for all purposes.

Figure 2:
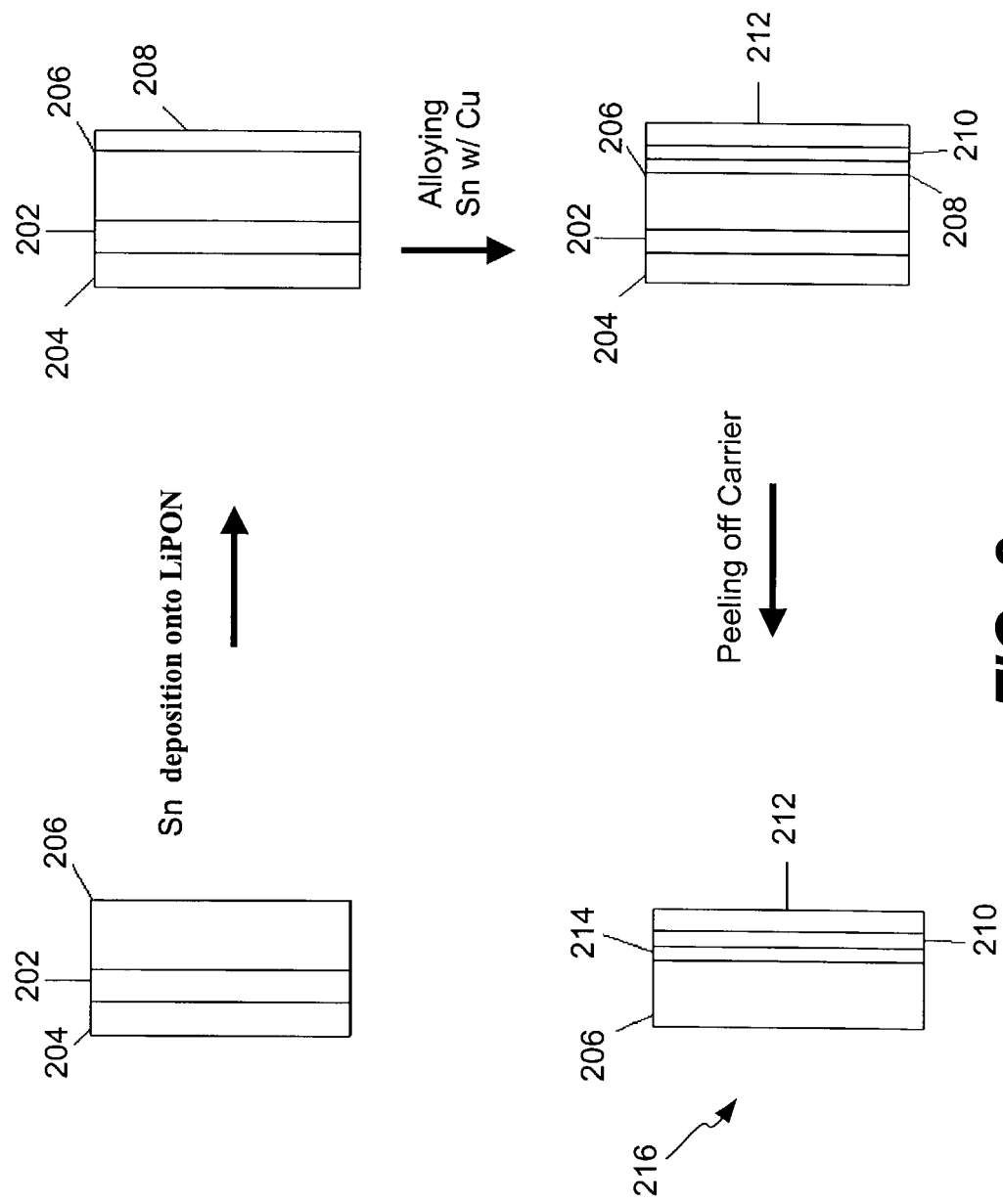
FIG. 2 is a schematic illustration of an uncharged, encapsulated alloy electrode being prepared according to a second specific embodiment of the present invention.

Referring to FIG. 2, a method of forming an encapsulated, uncharged alloy electrode in accordance another specific embodiment of the present invention is shown. In this embodiment, (which illustrates an example in which the electrode metal is Sn, the current collector is copper, and the protective barrier layer is LiPON), an electrode is fabricated as a laminate in the following manner. Initially, a thin layer of a release agent 202 is deposited on a web carrier 204 by evaporation, for example. This web carrier and the release agent should have a surface that is very smooth. Deposition of the release agent is followed by deposition of a glassy or amorphous protective barrier layer 206 onto release agent 202 by a suitable process such as sputtering or chemical vapor deposition. The barrier layer 206 is preferably a single ion conductor. It serves as a protective layer in the completed electrode and is therefore preferably a single ion conductor which conducts ions of the active metal used in the electrode (e.g., lithium). Because protective layer 206 is deposited on a very smooth surface, it too will be smooth and continuous.

A metal electrode material (e.g., Sn) 208 is then deposited on the barrier layer 206. Next, a current collector 210 (e.g., a copper layer of about 1000 angstroms to one micrometer thickness) is contacted with the metal electrode layer 208. The current collector 210 may be provided as a metalized plastic layer (e.g., 500 angstroms to 1 micrometer of Cu on a suitable plastic backing layer, such polyethylene terephthalate (PET), polypropylene, polyethylene, polyvinylchloride (PVC), polyolefins, polyimides, etc.). Alternatively, the current collector may be deposited on the metal electrode layer 208 by a conventional process such as evaporation. Once the electrode metal 208 and current collector 210 are contacted, annealing is performed as described above to produce an alloy electrode material (e.g., Cu—Sn) 214. Finally, the protective layer/alloy electrode/current collector laminate is peeled off of the carrier 204, with the release layer 202 giving way. The resulting structure is an encapsulated, uncharged alloy electrode 216.

As described and illustrated with reference to FIG. 1B, above, an electrode 216 formed according to the process described with reference to FIG. 2 may be subsequently charged through the protective layer with an active metal ion. The encapsulated charged electrode may be used as a cathode in a lithium metal battery, for example, paired with a sulfur electrode such as described in U.S. Pat. No. 5,686,201 titled RECHARGEABLE POSITIVE ELECTRODES, issued Nov. 11, 1997.

Preferably, the entire fabrication process described above with reference to FIG. 2 is conducted in a continuous fashion and under a vacuum. This ensures a high throughput for manufacturing and clean fresh surfaces for forming each layer of the laminate. The various steps in the process (e.g., forming the release agent, forming the protective layer, forming the active metal alloying metal layer, and contacting or forming the current collector) are performed sequentially at different stages. As the web passes through each successive station a fresh layer is formed thereon.

Figure 3D:
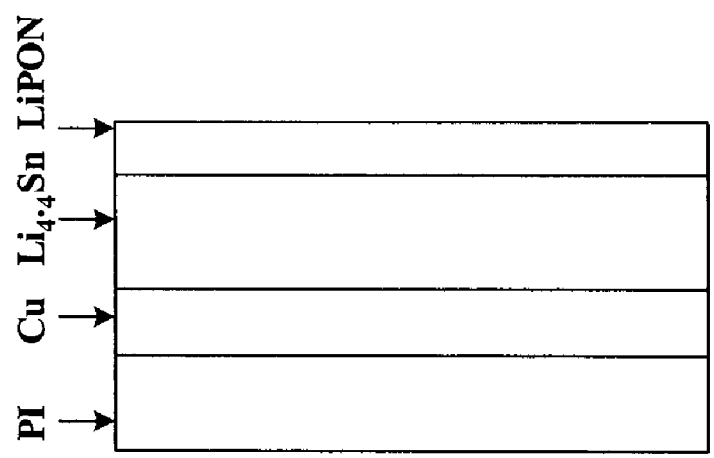

Referring to FIGS. 3A–3D, a further specific embodiment of the invention is illustrated and described in which a charged electrode is produced. According to this embodiment, an electrode metal, in this case tin (Sn), is applied to a barrier layer, in this case LiPON on carrier (PET) and release layers, to form a first structure (STRUCTURE 1), shown in FIG. 3A. As shown in FIG. 3B, in a second structure (STRUCTURE 2), the electrode metal is also applied to a current collector, in this case composed of copper (Cu) on a carrier (PI). The electrode material and current collector (e.g., Sn and Cu) of STRUCTURE 2 are then annealed as described above. The resulting alloy is then lithiated, for example, by evaporation of lithium onto the alloy surface. Other alkali metals may also be used in place of lithium. The deposited lithium preferentially alloys with the electrode metal (in this case Sn) to form a Li—Sn alloy (e.g., $Li_{4.4}Sn$). The stoichiometry may be varied to achieve a number of final compositions. In one embodiment, the final electrode of STRUCTURE 2 will have a gradient structure having a pure copper current collector bound by alloying to a Cu—Sn alloy electrode layer, which in turn is bound by alloying to a Li—Sn alloy. As noted above, charging the electrode alloy with lithium confers further dimensional stability (e.g., in all three volumetric dimensions) on the electrode material before contacting the electrode with a barrier layer material thereby further reducing the risk of damage to the barrier layer due to alloying-related electrode material expansion.

To complete the electrode, STRUCTURE 1 and STRUCTURE 2 are combined, as shown in FIG. 3C, and the Sn in the first structure binds by alloying to excess Li provided in the second structure. The resulting electrode, shown in FIG. 3D, is an encapsulated, fully charged anode suitable for use in a lithium metal battery. Of course, other barrier and electrode materials may be used, as described herein.

This fabrication processes of the present invention is preferably conducted in a continuous fashion and under a vacuum. In both cases, a protective layer laminate and a current collector laminate are initially formed and then bonded to form a single encapsulated electrode. The bonding may be accomplished by passing the two laminates through rollers. It is, of course, possible that the two laminates are bonded in a batch process.

When used in any of the foregoing embodiments, a web carrier supports continuous fabrication of the electrode laminate through a series of deposition reactors, it should withstand high temperatures and wide pressure ranges. Examples of suitable web materials include plastics such as polyethylene terephthalate (PET), polypropylene, polyethylene, polyvinylchloride (PVC), polyolefins, and polyimides. The web carrier should have a thickness and tensile strength suitable for web handling at the line speeds dictated by the metal and glass deposition steps.

The release agent serves to release the subsequently formed electrode from the web carrier. The particular release layer chosen depends upon the types of web carrier and protective layer employed. Suitable release agents are known in the art. In a specific embodiment, the release layer is a 50 angstrom copper film formed by evaporation or sputtering. The release agent should be as thin as possible while still retaining release properties, and easily dissolving in the target battery environments. In the case of a copper release, a thick copper release film could potentially block ionic transport to the glass layer. Therefore a thin Cu layer is envisaged whereby, once in the battery environment, the thin copper layer is removed by corrosion and/or dissolution, exposing the glass layer to the battery electrolyte.

Note that in the encapsulated electrodes produced in accordance with all three embodiments, the current collector includes a first surface which is exposed to the ambient and a second surface which intimately contacts the electrode layer. Where the electrode is charged with active metal, for example lithium, the active metal electrode includes a first surface which forms the interface with the current collector and a second surface which intimately contacts the protective layer. In turn, the protective layer includes a first surface which contacts the second surface of the active metal electrode and a second surface which is exposed to the ambient. The interfaces at the surfaces of the active metal electrode should be sufficiently continuous or intimate that moisture, air, electrolyte, and other agents from the ambient are prevented from contacting the active metal. In addition, the interface the active metal electrode and the current collector should provide a low resistance electronic contact. Finally, the interface between the active metal and the protective layer should provide a low resistance ionic contact.

Preferably, the current collectors employed with this invention form a physically rigid layer of material that does not alloy with active metal (e.g., lithium). They should be electronically conductive and unreactive to moisture, gases in the atmosphere (e.g., oxygen and carbon dioxide), electrolytes and other agents they are likely to encounter prior to, during, and after fabrication of a battery. Examples of materials useful as current collectors for this invention include copper, nickel, many forms of stainless steel, zinc, chromium, and compatible alloys thereof. The current collector should not alloy with, easily migrate into, or otherwise detrimentally effect the electrochemical properties of the active metal alloy layer. This also ensures that the current collector material does not redistribute during the charge and discharge cycles in which active metal is alternately plated and electrolytically consumed. The thickness of the current collector depends upon the material from which it is made. For many embodiments of interest, the current collector is between about 1 and 25 micrometers thick, more preferably between about 6 and 12 micrometers thick.

As noted above, the current collector may be provided as a metallized plastic layer. In this case, the current collector may be much thinner than a free-standing current collector. For example, the metal layer on plastic may be in the range of 500 angstroms to 1 micrometer in thickness. Suitable plastic backing layers for use with this type of current collector include polyethylene terephthalate (PET), polypropylene, polyethylene, polyvinylchloride (PVC), polyolefins, polyimides, etc. The metal layers put on such plastic substrates are preferably inert to lithium (e.g., they do not alloy with lithium) and may include at least those materials listed above (e.g., copper, nickel, stainless steel, and zinc). One advantage of this design is that it forms a relatively lightweight backing/current collector for the electrode.

The current collector may be prepared by a conventional technique for producing current collectors. The current collectors may be provided as sheets of the commercially available metals or metallized plastics. The surfaces of such current collectors may be prepared by standard techniques such as electrode polishing, sanding, grinding, and/or cleaning. At this point, the surface of the current collector should be smoother than the thickness of the protective glass layer subsequently deposited onto it. For example, a current collector with a surface roughness on the order of micrometers might not be suitable for deposition of a 1000 angstrom layer of glass. On the other hand, a current collector with a surface roughness of one micrometer might be suitable for deposition of a five micrometer thick layer of glass.

Alternatively, the current collector metals may be formed by a more exotic technique such as evaporation of the metal onto a substrate, physical or chemical vapor deposition of the metal on a substrate, etc. Such processes may be performed as part of a continuous process for constructing the electrode. Each step in the continuous process would be performed under vacuum.

Most generally, the lithium metal with which the invention is most often described above can be replaced with any metal, any mixture of metals capable of functioning as a negative electrode. However, the protective layers of this invention will find most use in protecting alloys of highly reactive metals such as alkali metals and alkaline earth metals. The thickness of the metal layer used in the electrodes of this invention depends upon the cell construction, the desired cell capacity, the particular metal employed, etc. For many applications, the active metal alloy thickness will preferably lie between about one and one hundred micrometers.

In one preferred embodiment, the materials for the negative electrodes include a metal such lithium or sodium or an alloy of one of these with one or more additional alkali metals and/or alkaline earth metals. Preferred alloys include lithium aluminum alloys, lithium silicon alloys, lithium tin alloys, and sodium lead alloys (e.g., $Na_4Pb$). Other metallic electrode materials may include alkaline earth metals such as magnesium and their alloys, aluminum, and transition metals such as, zinc, and lead and their alloys. The protective layer must be made from a compatible material. The material should be conductive to ions of the electrochemically active metal or metals in the negative electrode.

If the electrode is formed as a laminate including an electrolyte layer as in the third embodiment, that electrolyte should be a compatible solid state electrolyte or a compatible gelable material. Generally, though not necessarily, the solid state material is a polymeric material. Examples of polymeric electrolytes include polyethers, polyimines, polythioethers, polyphosphazenes, and polymer blends, mixtures, and copolymers thereof in which an appropriate electrolyte salt has optionally been added. Preferred polyethers are polyalkylene oxides, more preferably, polyethylene oxide. It is also possible, that the electrolyte layer is a ceramic or glass such as beta alumina-type materials. Specific examples include sodium beta alumina, Nasicon™ or Lisicon™ glass or ceramic. In one embodiment, the protective layer in the first or second embodiment is made sufficiently thick that it can serve as an electrolyte itself.

Protective Layer Composition

The protective layer serves to protect the active metal alloy in the electrode during cell cycling. It should protect the active metal alloy from attack from the electrolyte and reduce formation of dendrites and mossy deposits. In addition, protective layer should be substantially impervious to agents from the ambient. Thus, it should be free of pores, defects, and any pathways allowing air, moisture, electrolyte, and other outside agents to penetrate though it to the active metal alloy layer. In this regard, the composition, thickness, and method of fabrication may all be important in imparting the necessary protective properties to the protective layer. These features of the protective layer will be described in further detail below.

Preferably, the protective layer is so impervious to ambient moisture, carbon dioxide, oxygen, etc. that a lithium alloy electrode can be handled under ambient conditions without the need for elaborate dry box conditions as typically employed to process other lithium electrodes. Because the protective layer described herein provides such good protection for the lithium (or other active metal), it is contemplated that electrodes and electrode/electrolyte composites of this invention may have a quite long shelf life outside of a battery. Thus, the invention contemplates not only batteries containing a negative electrode, but unused negative electrodes and electrode/electrolyte laminates themselves. Such negative electrodes and electrode/electrolyte laminates may be provided in the form of sheets, rolls, stacks, etc. Ultimately, they are integrated with other battery components to fabricate a battery. The enhanced stability of the batteries of this invention will greatly simplify this fabrication procedure.

The protective layer should be a glass or amorphous material that conducts lithium (or other active metal) ion but does not significantly conduct other ions. In other words, it should be a single ion conductor. It should also be stable for the voltage window employed in the cell under consideration. Still further it should be chemically stable to a battery electrolyte, at least within the voltage window of the cell. Finally, it should have a high ionic conductivity for the lithium (or other active metal) ion.

The protective layer may be formed directly on a carrier or electrolyte by any suitable process. It can be deposited on these substrates by techniques such as physical vapor deposition and chemical vapor deposition. In a preferred embodiment, it is deposited by plasma enhanced chemical vapor deposition (PECVD). Examples of suitable physical vapor deposition processes include sputtering and evaporation (e.g., electron-beam evaporation). A PECVD technique is described in U.S. patent application Ser. No. 09/086,665, filed on May 19, 1998, and titled PROTECTIVE COATINGS FOR NEGATIVE ELECTRODES, which was previously incorporated herein by reference.

The protective layer is preferably composed of a glass or amorphous material that is conductive to metal ions of the negative electrode metal. Preferably, the protective layer does not conduct anions such as $S_8$=generated on discharge of a sulfur electrode (or other anions produced with other positive electrodes), or anions present in the electrolyte such as perchlorate ions from dissociation of lithium perchlorate.

In order to provide the needed ionic conductivity, the protective layer typically contains a mobile ion such as a metal cation of the negative electrode metal. Many suitable single ion conductors are known. Among the suitable glasses are those that may be characterized as containing a "modifier" portion and a "network former" portion. The modifier is often an oxide of the active metal in (i.e., the metal ion to which the protective layer is conductive). The network former is often a polymeric oxide or sulfide. One example is the lithium silicate glass $2Li_2O.1SiO_2$ and another example is the sodium borosilicate glass $2Na_2O.1SiO_2.2B_2O_3$.

The modifier/network former glasses employed in this invention may have the general formula $(M_2O)X(A_nD_m)$, where M is an alkali metal, A is boron, aluminum, silicon, or phosphorous, D is oxygen or sulfur. The values of n and m are dependent upon the valence on A. X is a coefficient that varies depending upon the desired properties of the glass. Generally, the conductivity of the glass increases as the value of X decreases. However, if the value of X becomes too small, separate phases of the modifier and network former arise. Generally, the glass should remain of a single phase, so the value of X must be carefully chosen.

The highest concentration of $M_2O$ should be that which yields the stoichiometry of the fully ionic salt of the network former. For instance $SiO_2$ is a polymeric covalent material; as $Li_2O$ is added to silica O-O bonds are broken yielding Si—OLi$^+$. The limit of $Li_2O$ addition is at the completely ionic stoichiometry, which for silica would be $Li_4SiO_4$, or $2Li_2O.SiO_2(Li_2O.0.5SiO_2)$. Any addition of $Li_2O$ beyond this stoichiometry would necessarily lead to phase separation of $Li_2O$ and $Li_4SiO_4$. Phase separation of a glass composition typically happens well before the fully ionic composition, but this is dependent on the thermal history of the glass and cannot be calculated from stoichiometry. Therefore the ionic limit can be seen as an upper maximum beyond which phase separation will happen regardless of thermal history. The same limitation can be calculated for all network formers, i.e. $Li_3BO_3$ or $3Li_2O.B_2O_3$, $Li_3AlO_3$ or $3Li_2O.Al_2O_3$, etc. Obviously, the optimum values of X will vary depending upon the modifier and network former employed.

Examples of the modifier include lithium oxide ($Li_2O$), lithium sulfide ($Li_2S$), lithium selenide ($Li_2Se$), sodium oxide ($Na_2O$), sodium sulfide ($Na_2S$), sodium selenide ($Na_2Se$), potassium oxide ($K_2O$), potassium sulfide ($K_2S$), potassium selenide ($K_2Se$), etc., and combinations thereof. Examples of the network former include silicon dioxide ($SiO_2$), silicon sulfide ($SiS_2$), silicon selenide ($SiSe_2$), boron oxide ($B_2O_3$), boron sulfide ($B_2S_3$), boron selenide ($B_2Se_3$), aluminum oxide ($Al_2O_3$), aluminum sulfide ($Al_2S_3$), aluminum selenide ($Al_2Se_3$), phosphorous pentoxide ($P_2O_5$), phosphorous pentasulfide ($P_2S_5$), phosphorous pentaselenide ($P_2Se_5$), phosphorous tetraoxide ($PO_4$), phosphorous tetrasulfide ($PS_4$), phosphorous tetraselenide ($PSe_4$), and related network formers.

"Doped" versions of the above two-part protective glasses may also be employed. Often the dopant is a simple halide of the ion to which the glass is conductive. Examples include lithium iodide (LiI), lithium chloride (LiCl), lithium bromide (LiBr), sodium iodide (NaI), sodium chloride (NaCl), sodium bromide (NaBr), etc. Such doped glasses may have general formula $(M_2O).X(A_nD_m).Y(MH)$ where Y is a coefficient and MH is a metal halide.

The addition of metal halides to glasses is quite different than the addition of metal oxides or network modifiers to glasses. In the case of network modifier addition, the covalent nature of the glass is reduced with increasing modifier addition and the glass becomes more ionic in nature. The addition of metal halides is understood more in terms of the addition of a salt (MH) to a solvent (the modifier/former glass). The solubility of a metal halide (MH) in a glass will also depend on the thermal history of the glass. In general it has been found that the ionic conductivity of a glass increases with increasing dopant (MH) concentration until the point of phase separation. However, very high concentrations of MH dopant may render the glass hygroscopic and susceptible to attack by residual water in battery electrolytes, therefore it might be desirable to use a graded interface where the halide concentration decreases as a function of distance from the negative electrode surface. One suitable halide doped glass is $Li_2OYLiCl.XB_2O_3.ZSiO_2$.

Single ion conductor glasses are particularly preferred as a protective layer used with this invention. One example is a lithium phosphorus oxynitride glass referred to as LiPON which is described in "A Stable Thin-Film Lithium Electrolyte: Lithium Phosphorus Oxynitride," J. Electrochem. Soc., 144, 524 (1997) and is incorporated herein by reference for all purposes. An example composition for LiPON is $Li_{2.9}PO_{3.3}N_{0.5}$. Examples of other glass films that may work include $6LiI—Li_3PO_4—P_2S_5$ and $B_2O_3—LiCO_3—Li_3PO_4$.

Other suitable protective layer glasses include high conductivity sulfide glasses, such as the $Li_2S—GeS_2$, $Li_2S—GaS_2$, $Li_2S—GeS_2—GaS_2$, and $Li_2S—Li_3PO_4—SiS_2$ glasses, that exhibit ionic conductivity in the range of $10^{-5}$ to $10^{-3}$ S/cm. See, Kazunori Takada, et al., "Research on highly reliable solid-state lithium batteries in NIRIM", Journal of Power Sources 97–98 (2001), pages 762–764; Kazunori Takada, et al., "Lithium iron sulfide as an electrode material in a solid state lithium battery", Solid State Ionics 117 (1999), pages 273–276; Ryoji Kanno, et al., "Synthesis of a new lithium ionic conductor, thio-LSIICON-lithium germanium sulfide system", Solid State Ionics 130 (2000), pages 97–104; Tilo P. Drusedau, et al, "Plasma deposited non-stoichiometric hydrogenated germanium sulfide a-Ge$_{1-x}$S$_x$:H (x<0.3)", Journal of Non-Crystalline Solids 198–200 (1996), pages 111–114; U.S. Pat. No. 5,500,291 (1997); Kazunori Takada, et al., "Electrochemical behaviors of Li+ ion conductor, $Li_3PO_4—Li_2S—SiS_2$", Journal of Power Sources, 43–44, (1993), pages 135–141; E Bychkov, et al., "Percolation transition in Ag-doped chalcogenide glasses: comparison of classical percolation and dynamic structure models", Solid State Ionics 113–115 (1998), pages 691–695; and Kazunori Takada, et al., "Electrochemical behavior of $Li_xO_2$ (M=Co, Ni) in all solid state cells using a glass electrolyte", Solid State Ionics 79 (1995), pages 284–287; each of which is incorporated by reference herein in its entirety and for all purposes. The high conductivity of these glasses may enhance performance of the protected lithium anode, and allow relatively thick films to be deposited without a large penalty in terms of ohmic resistance. The high ionic conductivity of these glasses also may allow the incorporation of elastomeric constituents into the film. For example a glass may be deposited by CVD at the same time an elastomeric polymer is deposited by CVD, forming a glass/polymer composite.

Regarding thickness, protective layer should be as thin as possible while still effectively protecting the active metal alloy electrode. Thinner layers have various benefits. Among these are flexibility and low ionic resistance. If a layer becomes too thick, the electrode cannot bend easily without cracking or otherwise damaging the protective layer. Also, the overall resistance of the protective layer is a function of thickness. However, the protective layer should be sufficiently thick to prevent electrolyte or certain aggressive ions from contacting the underlying alkali metal. The appropriate thickness will depend upon the deposition process. If the deposition process produces a high quality protective layer, then a rather thin layer can be employed. A high quality protective layer will be smooth and continuous and free of pores or defects that could provide a pathway for lithium metal or deleterious agents from the electrolyte.

For many protective layers, the optimal thickness will range between about 50 angstroms and 5 micrometers. More preferably, the thickness will range between about 100 angstroms and 3,000 angstroms. Even more preferably, the thickness will range between about 500 angstroms and 2,000 angstroms. For many high quality protective layers, an optimal thickness will be approximately 1000 angstroms.

In addition, the composition of the protective layer should have an inherently high ionic conductivity (e.g., between about $10^{-8}$ and about $10^{-2}$ (ohm-cm)$^{-1}$). Obviously, if a relatively good quality thin layer can be deposited, a material with a relatively low conductivity may be suitable. However, if relatively thicker layers are required to provide adequate protection, it will be imperative that the composition of the protective layer have a relatively high conductivity.

Battery Design

Batteries of this invention may be constructed according to various known processes for assembling cell components and cells. Generally, the invention finds application in any cell configuration. The exact structure will depend primarily upon the intended use of the battery unit. Examples include thin film with porous separator, thin film polymeric laminate, jelly roll (i.e., spirally wound), prismatic, coin cell, etc.

Generally, batteries employing the negative electrodes of this invention will be fabricated with an electrolyte. It is possible, however, that the protective layer could serve as a solid state electrolyte in its own right. If a separate electrolyte is employed, it may be in the liquid, solid (e.g., polymer), or gel state. It may be fabricated together with the negative electrode as a unitary structure (e.g., as a laminate). Such unitary structures will most often employ a solid or gel phase electrolyte.

The negative electrode is spaced from the positive electrode, and both electrodes may be in material contact with an electrolyte separator. Current collectors contact both the positive and negative electrodes in a conventional manner and permit an electrical current to be drawn by an external circuit. In a typical cell, all of the components will be enclosed in an appropriate casing, plastic for example, with only the current collectors extending beyond the casing. Thereby, reactive elements, such as sodium or lithium in the negative electrode, as well as other cell elements are protected.

Figure 4:
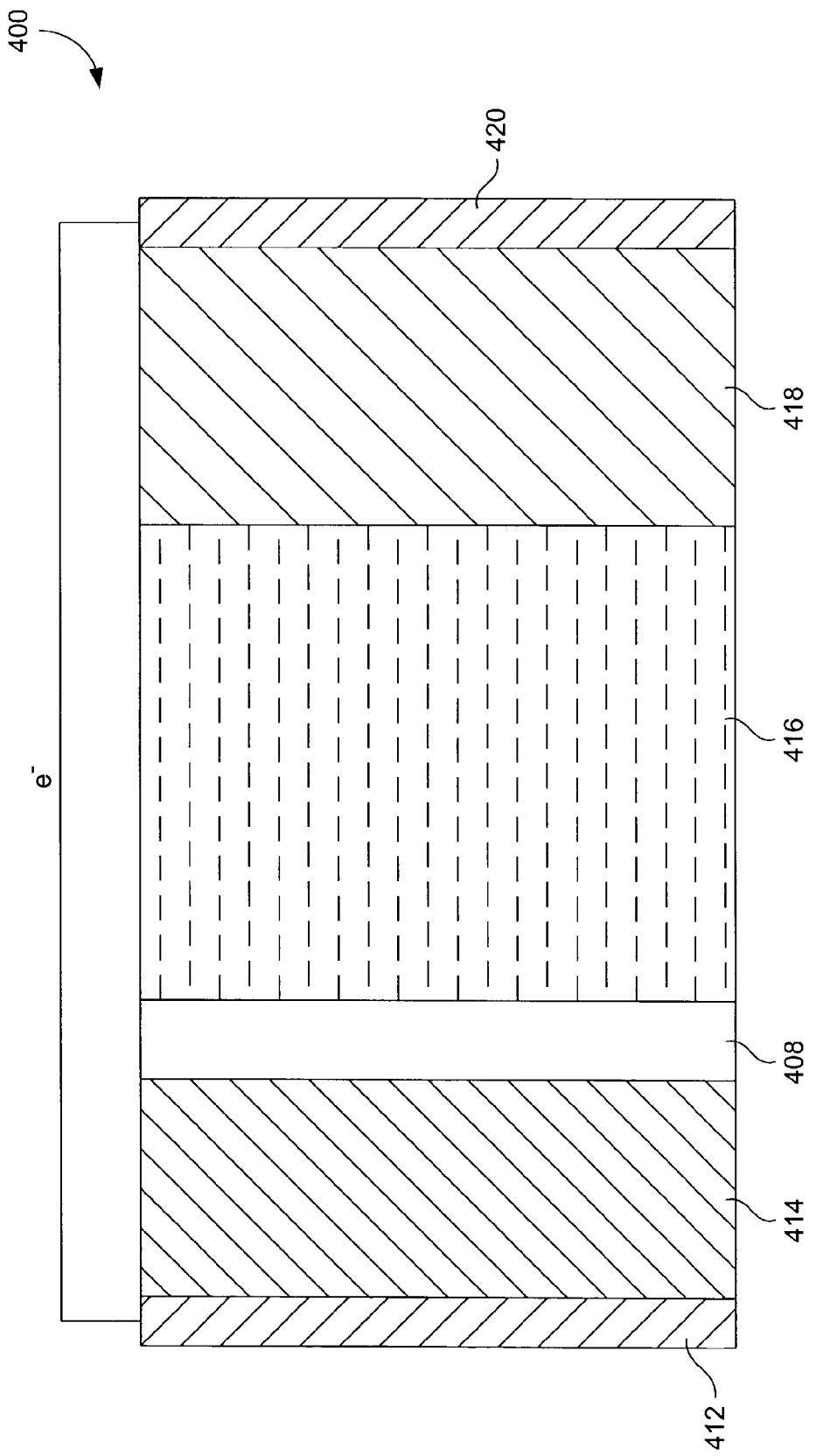
FIG. 4 is a block diagram of a battery formed from an electrode in accordance with the present invention.

Referring now to FIG. 4, a cell 400 in accordance with a preferred embodiment of the present invention is shown. Cell 400 includes a negative current collector 412 which is formed of an electronically conductive material. The current collector serves to conduct electrons between a cell terminal (not shown) and a negative electrode 414 (such as an active metal alloy) to which current collector 412 is affixed. Negative electrode 414 is made from lithium or other similarly active metal alloy material, and includes a protective layer 408 formed opposite current collector 412. Either negative electrode 414 or protective layer 408 contacts an electrolyte in an electrolyte region 416. As mentioned, the electrolyte may be liquid, gel, or solid (e.g., polymer). To simplify the discussion of FIG. 4, the electrolyte will be referred to as "liquid electrolyte" or just "electrolyte." An example of a solid electrolyte is polyethylene oxide. An example of gel electrode is polyethylene oxide containing a significant quantity of entrained liquid such as an aprotic solvent.

An optional separator in region 416 prevents electronic contact between the positive and negative electrodes. A positive electrode 418 abuts the side of separator layer 416 opposite negative electrode 414. As electrolyte region 416 is an electronic insulator and an ionic conductor, positive electrode 418 is ionically coupled to but electronically insulated from negative electrode 414. Finally, the side of positive electrode 418 opposite electrolyte region 416 is affixed to a positive current collector 420. Current collector 420 provides an electronic connection between a positive cell terminal (not shown) and positive electrode 418.

Current collector 420, which provides the current connection to the positive electrode, should resist degradation in the electrochemical environment of the cell and should remain substantially unchanged during discharge and charge. In one embodiment, the current collectors are sheets of conductive material such as aluminum or stainless steel. The positive electrode may be attached to the current collector by directly forming it on the current collector or by pressing a pre-formed electrode onto the current collector. Positive electrode mixtures formed directly onto current collectors preferably have good adhesion. Positive electrode films can also be cast or pressed onto expanded metal sheets. Alternately, metal leads can be attached to the positive electrode by crimp-sealing, metal spraying, sputtering or other techniques known to those skilled in the art. Some positive electrode can be pressed together with the electrolyte separator sandwiched between the electrodes. In order to provide good electrical conductivity between the positive electrode and a metal container, an electronically conductive matrix of, for example, carbon or aluminum powders or fibers or metal mesh may be used.

A separator may occupy all or some part of electrolyte compartment 316. Preferably, it will be a highly porous/permeable material such as a felt, paper, or microporous plastic film. It should also resist attack by the electrolyte and other cell components under the potentials experienced within the cell. Examples of suitable separators include glass, plastic, ceramic, and porous membranes thereof among other separators known to those in the art. In one specific embodiment, the separator is Celgard 2300 or Celgard 2400 available from Hoechst Celanese of Dallas, Tex.

In an alternative embodiment, no separator is employed. The protective layer on the negative electrode prevents the positive and negative electrodes from contacting one another and serves the function of a separator. In such cases, the protective layer should be tough. It may be relatively thick and made from a material that resists cracking and abrasion.

In some embodiments of the invention, the cell may be characterized as a "thin film" or "thin layer" cell. Such cells possess relatively thin electrodes and electrolyte separators. Preferably, the positive electrode is no thicker than about 300 μm, more preferably no thicker than about 150 μm, and most preferably no thicker than about 100 μm. The negative electrode preferably is no thicker than about 100 μm and more preferably no thicker than about 100 μm. Finally, the electrolyte separator (when in a fully assembled cell) is no thicker than about 100 μm and more preferably no thicker than about 40 μm.

Charged electrodes in accordance with the present invention can be used with any of a number of battery systems employing a highly reactive negative alloy electrode incorporating such metals as lithium or other alkali metal. For example, any positive electrode used with lithium metal or lithium ion batteries may be employed. These include lithium manganese oxide, lithium cobalt oxide, lithium nickel oxide, lithium vanadium oxide, etc. Mixed oxides of these compounds may also be employed such as lithium cobalt nickel oxide. Moreover, uncharged electrodes in accordance with the present invention may be used as anodes in lithium-ion batteries. As will be explained in more detail below, a preferred application of the electrodes of this invention is in lithium-sulfur batteries.

While the above examples are directed to rechargeable batteries, the invention may also find application in primary batteries. Examples of such primary batteries include lithium-manganese oxide batteries, lithium-(CF), chloride batteries, lithium sulfur dioxide batteries and lithium iodine batteries. In a particularly preferred embodiment, these primary batteries would be formed in the discharged state; that is, the lithium is plated to the negative electrode in situ. In this embodiment, the primary cells would have extremely long shelf lives because no free lithium is present during the storage and transportation phase.

The protective layer allows one to use an active metal alloy electrode in a manner that resembles the use of lithium ion batteries. Lithium ion batteries were developed because they had a longer cycle life and better safety characteristics than metal lithium batteries. The relatively short cycle life of metallic lithium batteries has been due, in part, to the formation of dendrites of lithium which grow from the lithium electrode across the electrolyte and to the positive electrode where they short circuit the cells. Not only do these short circuits prematurely degrade the cells, they pose a serious safety risk. The protective layer of this invention prevents formations of dendrites and thereby improves the cycle life and safety of metallic lithium batteries. Further, the batteries of this invention will perform better than lithium ion batteries because they do not require a carbon intercalation matrix to support lithium ions. Because the carbon matrix does not provide a source of electrochemical energy, it simply represents dead weight that reduces a battery's energy density. Because the present invention does not employ a carbon intercalation matrix, it has a higher energy density than a conventional lithium ion cell—while providing better cycle life and safety than metallic lithium batteries studied to date. In addition, the lithium metal batteries of this invention do not have a large irreversible capacity loss associated with the "formation" of lithium ion batteries.

Lithium-Sulfur Batteries

Sulfur positive electrodes and metal-sulfur batteries are described in U.S. Pat. No. 5,686,201 issued to Chu on Nov. 11, 1997 and U.S. patent application Ser. No. 08/948,969 naming Chu et al. as inventors, filed on Oct. 10, 1997. Both of these documents are incorporated by reference for all purposes. The sulfur positive electrodes preferably include in their theoretically fully charged state sulfur and an electronically conductive material. At some state of discharge, the positive electrode will include one or more polysulfides and possibly sulfides, which are polysulfides and sulfides of the metal or metals found in the negative electrode. In some embodiments, the fully charged electrode may also include some amount of such sulfides and/or polysulfides.

The positive electrode is fabricated such that it permits electrons to easily move between the sulfur and the electronically conductive material, and permits ions to move between the electrolyte and the sulfur. Thus, high sulfur utilization is realized, even after many cycles. If the lithium-sulfur battery employs a solid or gel state electrolyte, the positive electrode should include an electronic conductor (e.g., carbon) and an ionic conductor (e.g., polyethylene oxide) in addition to the sulfur electroactive material. If the battery employs a liquid electrolyte, the positive electrode may require only an electronic conductor in addition to the sulfur electroactive material. The electrolyte itself permeates the electrode and acts as the ionic conductor. In the case of a liquid electrolyte cell, the battery design may assume two formats: (1) all active sulfur (elemental sulfur, polysulfides and sulfides of the positive electrode) is dissolved in electrolyte solution (one phase positive electrode) and (2) the active sulfur is distributed between a solid phase (sometimes precipitated) and a liquid phase.

When the lithium alloy-sulfur battery cells of this invention include a liquid electrolyte, that electrolyte should keep many or all of sulfur discharge products in solution and therefore available for electrochemical reaction. Thus, they preferably solubilize lithium sulfide and relatively low molecular weight polysulfides. In a particularly preferred embodiment, the electrolyte solvent has repeating ethoxy units ($CH_2CH_2O$). This may be a glyme or related compound. Such solvents are believed to strongly coordinate lithium and thereby increase the solubility of discharge products of lithium-sulfur batteries. Suitable liquid electrolyte solvents are described in more detail in U.S. patent application Ser. No. 08/948,969, previously incorporated by reference.

It should be understood that the electrolyte solvents of this invention may also include cosolvents. Examples of such additional cosolvents include sulfolane, dimethyl sulfone, dialkyl carbonates, tetrahydrofuran (THF), dioxolane, propylene carbonate (PC), ethylene carbonate (EC), dimethyl carbonate (DMC), butyrolactone, N-methylpyrrolidinone, dimethoxyethane (DME or glyme), hexamethylphosphoramide, pyridine, N,N-diethylacetamide, N,N-diethylformamide, dimethylsulfoxide, tetramethylurea, N,N-dimethylacetamide, N,N-dimethylformamide, tributylphosphate, trimethylphosphate, N,N,N',N'-tetraethylsulfamide, tetraethylenediamine, tetramethylpropylenediamine, pentamethyldiethylenetriamine, methanol, ethylene glycol, polyethylene glycol, nitromethane, trifluoroacetic acid, trifluoromethanesulfonic acid, sulfur dioxide, boron trifluoride, and combinations of such liquids.

The protective layers employed in this invention may allow the use of electrolyte solvents that work well with sulfides and polysulfides but may attack lithium. Examples of solvents in this category include amine solvents such as diethyl amine, ethylene diamine, tributyl amine, amides such as dimethyl acetamide and hexamethyl phosphoramide (HMPA), etc.

Exemplary but optional electrolyte salts for the battery cells incorporating the electrolyte solvents of this invention include, for example, lithium trifluoromethanesulfonimide ($LiN(CF_3SO_2)_2$), lithium triflate ($LiCF_3SO_3$), lithium perchlorate ($LiClO_4$), $LiPF_6$, $LiBF_4$, and $LiAsF_6$, as well as corresponding salts depending on the choice of metal for the negative electrode, for example, the corresponding sodium salts. As indicated above, the electrolyte salt is optional for the battery cells of this invention, in that upon discharge of the battery, the metal sulfides or polysulfides formed can act as electrolyte salts, for example, $M_{x/z}S$ wherein x=0 to 2 and z is the valence of the metal.

As mentioned, the battery cells of this invention may include a solid-state electrolyte. An exemplary solid-state electrolyte separator is a ceramic or glass electrolyte separator which contains essentially no liquid. Specific examples of solid-state ceramic electrolyte separators include beta alumina-type materials such as sodium beta alumina, Nasicon™ or Lisicon™ glass or ceramic. Polymeric electrolytes, porous membranes, or combinations thereof are exemplary of a type of electrolyte separator to which an aprotic organic plasticizer liquid can be added according to this invention for the formation of a solid-state electrolyte separator generally containing less than 20% liquid. Suitable polymeric electrolytes include polyethers, polyimines, polythioethers, polyphosphazenes, polymer blends, and the like and mixtures and copolymers thereof in which an appropriate electrolyte salt has optionally been added. Preferred polyethers are polyalkylene oxides, more preferably, polyethylene oxide.

In the gel-state, the electrolyte separator generally contains at least 20% (weight percentage) of an organic liquid (see the above listed liquid electrolytes for examples), with the liquid being immobilized by the inclusion of a gelling agent. Many gelling agents such as polyacrylonitrile, polyvinylidene difluoride (PVDF), or polyethylene oxide (PEO), can be used.

It should be understood that some systems employing liquid electrolytes are commonly referred to as having "polymer" separator membranes. Such systems are considered liquid electrolyte systems within the context of this invention. The membrane separators employed in these systems actually serve to hold liquid electrolyte in small pores by capillary action. Essentially, a porous or microporous network provides a region for entraining liquid electrolyte. Such separators are described in U.S. Pat. No. 3,351,495 assigned to W. R. Grace & Co. and U.S. Pat. Nos. 5,460,904, 5,540,741, and 5,607,485 all assigned to Bellcore, for example. Each of these patents is incorporated herein by reference for all purposes.

The fully charged state of some cells of this invention need not require that the positive electrode be entirely converted to elemental sulfur. It may be possible in some cases to have the positive electrode be a highly oxidized form of lithium polysulfide, for example, as in $Li_2S_x$ where x is five or greater. The fully charged positive electrode may also include a mixture of such polysulfides together with elemental sulfur and possibly even some sulfide. It should be understood that during charge, the positive electrode would generally not be of uniform composition. That is, there will be some amount of sulfide, sulfur, and an assortment of polysulfides with various values of x. Also, while the electrochemically active material includes some substantial fraction of "sulfur," this does not mean that the positive electrode must rely exclusively upon sulfur for its electrochemical energy.

The electronic conductor in the positive electrode preferably forms an interconnected matrix so that there is always a clear current path from the positive current collector to any position in the electronic conductor. This provides high availability of electroactive sites and maintained accessibility to charge carriers over repeated cycling. Often such electronic conductors will be fibrous materials such as a felt or paper. Examples of suitable materials include a carbon paper from Lydall Technical Papers Corporation of Rochester, N.H. and a graphite felt available from Electrosynthesis Company of Lancaster, N.Y.

The sulfur is preferably uniformly dispersed in a composite matrix containing an electronically conductive material. Preferred weight ratios of sulfur to electronic conductor in the sulfur-based positive electrodes of this invention in a fully charged state are at most about 50:1, more preferably at most about 10:1, and most preferably at most about 5:1. The sulfur considered in these ratios includes both precipitated or solid phase sulfur as well as sulfur dissolved in the electrolyte. Preferably, the per weight ratio of electronic conductor to binder is at least about 1:1 and more preferably at least about 2:1.

The composite sulfur-based positive electrode may further optionally include performance enhancing additives such as binders, electrocatalysts (e.g., phthalocyanines, metallocenes, brilliant yellow (Reg. No. 3051-11-4 from Aldrich Catalog Handbook of Fine Chemicals; Aldrich Chemical Company, Inc., 1001 West Saint Paul Avenue, Milwaukee, Wis.) among other electrocatalysts), surfactants, dispersants (for example, to improve the homogeneity of the electrode's ingredients), and protective layer forming additives to protect a lithium negative electrode (e.g., organosulfur compounds, phosphates, iodides, iodine, metal sulfides, nitrides, and fluorides). Preferred binders (1) do not swell in the liquid electrolyte and (2) allow partial but not complete wetting of the sulfur by the liquid electrolyte. Examples of suitable binders include Kynar available from Elf Atochem of Philadelphia, Pa., polytetrafluoroethylene dispersions, and polyethylene oxide (of about 900 k molecular weight for example). Other additives include electroactive organodisulfide compounds employing a disulfide bond in the compound's backbone. Electrochemical energy is generated by reversibly breaking the disulfide bonds in the compound's backbone. During charge, the disulfide bonds are reformed. Examples of organodisulfide compounds suitable for use with this invention are presented in U.S. Pat. Nos. 4,833,048 and 4,917,974 issued to DeJonghe et al. and U.S. Pat. No. 5,162,175 issued to Visco et al.

EXAMPLE

The following Example is provided to illustrate certain aspects of the present invention. The Example will serve to further illustrate the invention but is not meant to limit the scope of the invention in any way.

1. Cu—Sn Alloy Preparation

Two methods of Cu—Sn alloy preparation were used:

Method 1

A 50 µm thick Cu foil (99.999% purity) from Alfa Aesar was used as a substrate for Sn deposition. Sn was thermally evaporated under vacuum (~2×10$^{-5}$ torr) using a tungsten basket. Sn wire used for evaporation was 99.99% pure. The thickness of the deposited Sn layer was 2.0 µm according to Quartz Monitor Thickness measurements. Then, the Sn film on the Cu substrate was transferred to an Ar-filled glove box, where it was placed in an oven and annealed at 200° C. for 20 hours under constant pressure of about 4500 psi in order to smoothen the surface of the intermetallic compound layer during formation. This was achieved by placing the specimen in the hydraulic press equipped with hot plates. As a result, a layer of the intermetallic compound $Cu_6Sn_5$ was formed on the Cu substrate.

Method 2

Instead of vacuum deposition, Sn electroplating onto Cu substrate was performed at the current density of 2.5 mA/cm² from an aqueous solution containing 35 g/l of $Sn_2P_2O_7$, 130 g/l of $K_4P_2O_7$, and 0.3 g/l of gelatin. Then the specimen was annealed exactly as described above.

2. Electrochemical Cell and Charge/Discharge Cycling

A two-electrode electrochemical cell was constructed containing a Cu—Sn anode, a 125 μm thick Li foil counter electrode and a micro-porous polymeric separator having a nominal thickness of 25 microns (Hoechst Celanese, Celgard 2400). The electrolyte used was 1 M $LiPF_6$ dissolved in a 50/50 v/v mixture of ethylene carbonate (EC) and dimethyl carbonate (DMC). Concentration of moisture in electrolyte solution did not exceed 10 ppm.

Cells were assembled and tested in the Ar-filled glove box. The cells were cycled at 25° C. with a Series 4000 battery test system from Maccor Inc. of Tulsa, Okla. Charging of Cu—Sn electrodes (Li intercalation into Cu—Sn) was performed at 0.1 mA/cm² to a cell cutoff voltage of 0.005 V. During first three cycles a two-step charge was used: after charging at 0.1 mA/cm² the cell was charged at 0.05 mA/cm² to the same cutoff voltage. Discharge of Cu—Sn electrodes (Li de-intercalation from Cu—Sn) was performed at 0.1 mA/cm² to cutoff voltage of 1.5 V. During first three cycles the cell was charged at 0.1 mA/cm² and then at 0.05 mA/cm² to the same cutoff voltage of 1.5 V.

3. LiPON Deposition

Deposition of the LiPON glass layer onto Cu—Sn surface was performed by reactive RF sputtering of lithium phosphate in the presence of nitrogen. Glass deposition was done using an 8 inch diameter target at 1000W RF power for a sputtering duration of about 4 hours.

4. Cycling Results

Figure 5:
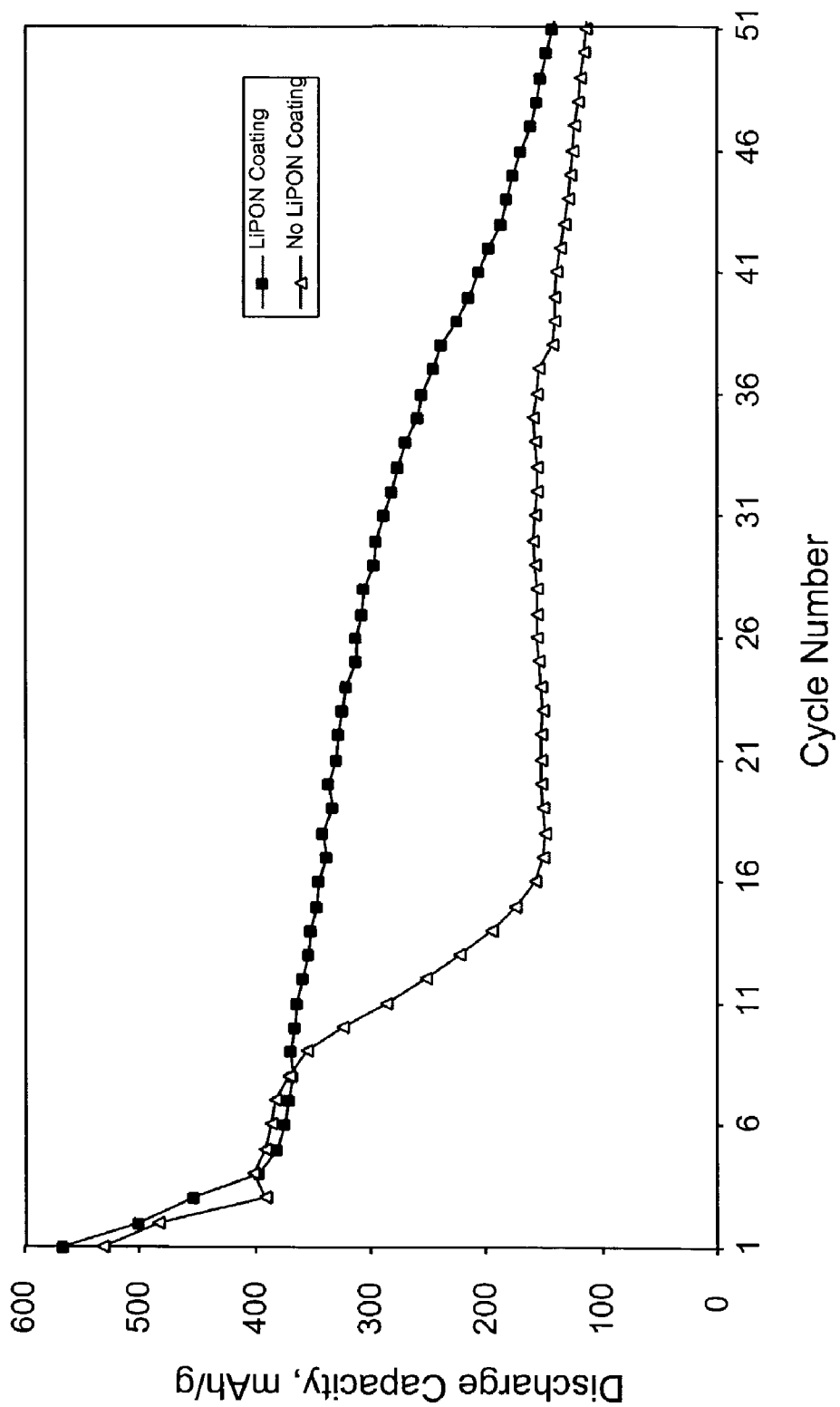
FIG. 5 is a graph showing an example of the discharge capacity of Cu—Sn alloy electrodes per unit of Sn weight vs the number of discharge/charge cycles for encapsulated electrodes in accordance with the present invention and unencapsulated electrodes.

Four cells with Cu—Sn electrodes prepared by method 1 (vacuum deposition of Sn onto Cu followed by annealing in the oven) were made and tested. Four other cells having Cu—Sn electrodes coated with the LiPON layer were assembled and tested simultaneously. In FIG. 5, the discharge capacity of Cu—Sn alloy electrode per unit of Sn weight is plotted vs the number of discharge/charge cycles. Average data for four cells with Cu—Sn electrodes coated with the LiPON and four cells without LiPON coating on Cu—Sn are presented. It can be seen in FIG. 5 that the discharge capacity for electrodes without the LiPON coating drops dramatically after the first 10 cycles. However, the cells having the LiPON-coated Cu—Sn electrodes show discharge capacity in excess of 300 mAh/g for 30 cycles.

CONCLUSION

The present invention provides improved methods and structures providing battery electrode materials suitable for use in lithium (and other such reactive metal) batteries.

Although the foregoing invention has been described in some detail for purposes of clarity of understanding, it will be apparent that certain changes and modifications may be practiced within the scope of the appended claims. It should be noted that there are many alternative ways of implementing both the process and compositions of the present invention. Accordingly, the present embodiments are to be considered as illustrative and not restrictive, and the invention is not to be limited to the details given herein, but may be modified within the scope and equivalents of the appended claims.

All references cited herein are incorporated by reference for all purposes.

What is claimed is:

1. A method of fabricating an active metal battery electrode, the method comprising:
   contacting a current collector metal layer with an active metal alloying metal layer;
   annealing the current collector metal layer and the active metal alloying metal layer such that a bond is formed there-between by alloying at the interface of the current collector metal layer and the active metal alloying metal layer to form a substantially at least two-dimensionally stable annealed layer;
   providing a substantially impervious barrier layer on the annealed layer, said barrier layer being conductive to ions of the active metal; and
   applying an active metal to said annealed layer prior to providing the barrier layer, such that the active metal alloys with the active metal alloying layer in the annealed layer to form a charged active metal alloy electrode;
   wherein the active metal alloying metal layer is tin and the active metal is lithium; and
   wherein the lithium is applied in stoichiometric excess to the tin in the annealed layer to form a lithiated annealed layer; and
   wherein the barrier layer is provided on the annealed layer by a process comprising,
      depositing a second layer of tin on the barrier layer to form a first structure,
      contacting the second layer of tin on the barrier layer of the first structure with the lithiated annealed layer comprising a second structure, such that a bond is formed between the two structures by alloying of tin and excess lithium in the respective structures.

2. The method of claim 1, wherein the current collector metal layer is copper.

3. The method of claim 2, wherein the annealing of the current collector metal layer and the active metal alloying metal layer is conducted at a temperature of about 200° C.

4. The method of claim 1, wherein the barrier layer is a glass layer that includes at least one of a lithium silicate, a lithium borate, a lithium aluminate, a lithium phosphate, a lithium phosphorus oxynitride, a lithium silicosulfide, a lithium borosulfide, a lithium aluminosulfide, a lithium phosphosulfide, and a high conductivity sulfide glass.

5. The method of claim 1, wherein the barrier layer is lithium phosphorus oxynitride (LiPON).

6. The method of claim 1, wherein the barrier layer is a glass layer having a thickness of between about 50 angstroms and 5 micrometers.

7. The method of claim 1, wherein the barrier layer has an ionic conductivity of between about $10^{-8}$ and about $10^{-2}$ (ohm-cm)$^{-1}$.

8. The method of claim 2, wherein the active metal alloying metal layer is a layer of tin having a thickness of between about 0.1 μm and 60 μm.

9. The method of claim 8, wherein the annealed layer has a copper to tin ratio greater than the stoichiometric ratio of copper to tin in the intermetallic compound $Cu_6Sn_5$.

10. The method of claim 8, wherein the copper current collector has a thickness of about 5 microns and the tin layer has a thickness of between about 2 microns.

* * * * *